(12) United States Patent
Denis

(10) Patent No.: US 6,273,233 B1
(45) Date of Patent: Aug. 14, 2001

(54) IRREVERSIBLE ADJUSTMENT MECHANISM

(75) Inventor: Christophe Denis, Athis de l'Orne (FR)

(73) Assignee: Bertrand Faure Equipments SA, Boulogne (FR)

( * ) Notice: Subject to any disclaimer, the term of this patent is extended or adjusted under 35 U.S.C. 154(b) by 0 days.

(21) Appl. No.: 09/548,549

(22) Filed: Apr. 13, 2000

(30) Foreign Application Priority Data

Apr. 16, 1999 (FR) .................................................. 99 04796

(51) Int. Cl.[7] ..................................................... F16D 41/08
(52) U.S. Cl. ............................ 192/223.2; 192/38; 192/44
(58) Field of Search .................................. 192/223.2, 38, 192/44; 188/83, 82.2, 82.84; 297/374, 340, 344.1, 344.12

(56) References Cited

U.S. PATENT DOCUMENTS

| | | | |
|---|---|---|---|
| 4,371,065 | 2/1983 | Engels et al. | 192/8 C |
| 4,533,027 | 8/1985 | Otani et al. | 192/8 C |
| 4,540,217 | 9/1985 | Suzuki | 297/391 |
| 4,786,110 | 11/1988 | Mahling et al. | 297/362 |
| 5,248,017 | 9/1993 | Schwarzbich | 192/8 R |
| 5,460,253 | * 10/1995 | Ritter et al. | 297/374 |
| 5,522,488 | * 6/1996 | Schwarzbich | 192/38 X |
| 5,593,210 | 1/1997 | Schwarzbich | 297/361.1 |
| 5,794,479 | * 8/1998 | Schwarzbich | 192/44 X |
| 5,896,973 | * 4/1999 | Hochmuth et al. | 192/223.2 |
| 6,032,777 | * 3/2000 | Denis | 192/223.2 |
| 6,206,164 | * 3/2001 | Kurita | 192/223.2 |

FOREIGN PATENT DOCUMENTS

| | | |
|---|---|---|
| 37 34 363 | 4/1989 | (DE) . |
| 0 631 901 | 1/1995 | (EP) . |

* cited by examiner

Primary Examiner—Charles A Marmor
Assistant Examiner—Saúl Rodriguez
(74) Attorney, Agent, or Firm—Marshall, O'Toole, Gerstein, Murray & Borun

(57) ABSTRACT

An irreversible adjustment mechanism comprising a pivoting lever resiliently assisted to a neutral position, an intermediate pivoting part connected to the lever by a driving stage adapted to move the intermediate part only when the lever moves away from its neutral position, a fixed collar, an output part delimiting with the collar wedge-shaped hollow spaces directed in opposite directions, and a locking stage ensuring an irreversible transmission between the intermediate part and the output part with a certain angular play of the intermediate part. The intermediate part is braked with a braking torque sufficient to lock the intermediate part in each return movement of the input part to its neutral position.

10 Claims, 1 Drawing Sheet

IRREVERSIBLE ADJUSTMENT MECHANISM

FIELD OF THE INVENTION

The present invention relates to irreversible adjustment mechanisms, in particular for vehicle seats.

More particularly, the invention concerns an irreversible adjustment mechanism comprising:

a fixed support, an input part mounted to pivot relative to the support around an axis of rotation, this input part being resiliently assisted towards a neutral position and being moveable along a first direction from the neutral position, in a first angular sector, and along a second direction opposite to the first direction from the neutral position, in a second angular sector, an intermediate part pivoting mounted around the axis of rotation, a driving stage connecting the input part to the intermediate part and adapted:

to positively drive the intermediate part with the input part by means of at least one driving part when the input part is moved by moving away from its neutral position, and to move the driving part with the input part when this input part returns to its neutral position, with friction of the driving part against the intermediate part, a locking surface which is integral with the support and which has a shape of revolution centered on the axis of rotation, an output part which is pivoting mounted around the axis of rotation and which is shaped to radially delimit, with the locking surface, at least one pair of wedge-shaped spaces including first and second hollow wedge-shaped spaces, these first and second wedge-shaped spaces diverging respectively in the first and second angular directions, and a locking stage connecting the intermediate part to the output part, this locking stage comprising:

at least one pair of clamping bodies including first and second rigid clamping bodies which are arranged respectively in the first and second wedge-shaped spaces and which are resiliently assisted in the first and second angular directions respectively in order to be wedged between the output part and the locking surface, at least first and second rigid stop surfaces integral with the intermediate part, which are directed in the first and second angular directions respectively, the first stop surface being adapted to abut against the first clamping body by unwedging it when the intermediate part turns in the first angular direction, and the second stop surface being adapted to abut against the second clamping body by unwedging it when the intermediate part turns in the second angular direction, the first and second stop surfaces having a certain angular play relative to the first and second clamping bodies, and at least first and second counter stops which are integral with the output part, the first counter stop surface being adapted to limit the relative movement of the intermediate part relative to the output part in the first angular direction after said first stop surface has sufficiently moved the first clamping body to unwedge it, so as to then cause the intermediate part to drive said output part, and the second counter stop surface being adapted to limit the relative movement of the intermediate part relative to the output part in the second angular direction after said second stop surface has sufficiently moved the second clamping body to unwedge it, so as then to make the intermediate part drive the output part (in particular by direct contact with intermediate part stops or again by abutment of the clamping bodies against the counter stop surfaces when the stop surfaces of the intermediate part move said clamping body).

BACKGROUND OF THE INVENTION

The document EP-A-0 631 901 describes various examples of such irreversible adjustment mechanisms.

Mechanisms of this type enable continuous adjustment of a component driven by the output part by carrying out one or more alternating "pumping" movements:

either in the first angular sector from the neutral position of the input part to move the component driven by the output part in a certain direction, or in the second angular sector to move the component driven by the output part in the opposite direction.

For example, such mechanisms can be used in particular to adjust the height of the seat part of a vehicle seat.

These known mechanisms taken as a whole give satisfaction, but however have the disadvantage that, when the input part pivots in one of the angular directions from its neutral position, the output part is itself only driven after a certain dead angular travel which is random (this dead angular travel can have for example a maximum value of 9 degrees, and vary randomly between 5 and 9 degrees under load).

This random variation of the dead angular travel is due to the fact that the positioning of the first and second stop surfaces relative to the first and second clamping bodies is itself random, in view of:

the play existing between said stop surfaces and said clamping bodies (this play is made compulsory to guarantee that the clamping bodies can in every case wedge in the first and second wedge-shaped spaces immobilizing in this way the output part relative to the fixed support whilst the input part does not turn), and the friction between the driving part and the intermediate part at the time of each return movement of the input part to its neutral position.

OBJECTS AND SUMMARY OF THE INVENTION

The particular object of the present invention is to overcome this disadvantage.

To this end, according to the invention, an irreversible adjusting mechanism of the type in question is mainly characterized in that the intermediate part is braked relative to the support, with a braking torque sufficient to hold the intermediate part fixed at the time of each return movement of the input part to its neutral position, after locking the locking stage.

By means of these arrangements, after the input part has undergone a first alternating "pumping" movement in the first angular sector, the first stop surface remains in contact with the first clamping body, so that it is necessary to carry out a second similar alternating movement of the output part in the first angular sector, this second movement results in an almost immediate movement of the output part, as soon as said first stop surface has sufficiently moved the first clamping body to unwedge it (case of operating empty) or as soon as the intermediate part drives the first counter stop (case of operating under load).

At the time of this second activation, the dead travel is therefore reduced to its incompressible minimum, i.e.:

the small dead travel necessary to drive the intermediate part by the input part, for example about 1 degree, and if the need arises (if the adjustment mechanism is under load, i.e. if it must overcome an opposing torque) the small dead travel (for example about 2 degrees) necessary in order that the intermediate part engages (directly or indirectly) with the first counter stop of the output part.

The dead travel during said second activating of the input part is therefore reduced to 1 degree when empty and to 3 degrees under load, in the example considered.

The operation is similar when the input part undergoes alternate "pumping" movements in the second angular sector.

In preferred versions of the invention, one and/or other of the following arrangements can possibly be resorted to:

the braking torque sustained by the intermediate part is between 0.2 and 1 Nm (Newton meter);

the intermediate part is braked by means of a braking part which is integral with the support and which is radially friction supported against said intermediate part ;

the braking part is a collar which is in contact with the intermediate part in three support zones;

the support includes a casing which contains at least the intermediate part, which intermediate part is braked by means of at least one braking block which is integral with said casing and which is applied axially with friction against said intermediate part, parallel to the axis of rotation;

the intermediate part is braked by at least three braking blocks which are integral with the casing and which are applied axially with friction against said intermediate part, parallel to the axis of rotation;

the casing is made of sheet metal and each braking block is constituted by a tab cut out in the sheet metal of said casing;

the first and second clamping bodies of each pair of clamping bodies are acted upon in the mutual space by a compression spring and are surrounded by a pair of axial fingers including first and second axial fingers integral with the intermediate part, these first and second axial fingers including respectively the first and second stop surfaces, the first counter stop surface of the output part being adapted to abut against the second axial finger of the intermediate part when this intermediate part moves in the first angular direction, and the second counter stop surface of the output part being adapted to abut against the first axial finger of the intermediate part when this intermediate part is moved in the second angular direction;

the driving stage comprises:

a support surface integral with the intermediate part, which support surface has a shape of revolution centered on the axis of rotation and radially delimits with the input part an intermediate hollow annular space, the input part comprising at least one boss which projects into said intermediate annular space and which delimits first and second wedge shaped zones in this intermediate annular space, these first and second wedge shaped zones diverging respectively in the first and second angular directions, a pair of wedging bodies comprising first and second rigid wedging bodies which are arranged in the intermediate annular space and which are resiliently assisted towards the first and second wedge shaped zones of said intermediate annular space in order to be wedged between the boss of the input part and the support surface of the intermediate part, these first and second wedging bodies each constituting one of the abovementioned driving parts, and at least one fixed axial finger which is integral with the support and which is arranged in said intermediate annular space, the boss of the input part being arranged facing the fixed axial finger when said input part is in its neutral position;

the driving stage comprises at least three pairs of wedging bodies, the first and second wedging bodies of each pair of wedging bodies being arranged on either side of a fixed axial finger and of a boss of the input part, the first wedging body of each pair of wedging bodies being held spaced from the second wedging body of an adjacent pair of wedging bodies by a compression spring.

BRIEF DESCRIPTION OF THE DRAWINGS

Other characteristics and advantages of the invention will emerge during the following description of two of its versions, given as non-restrictive examples, with reference to the appended drawings.

On the drawings.

MORE DETAILED DESCRIPTION

In the different figures, the same references designate identical or similar components.

Figure 1:
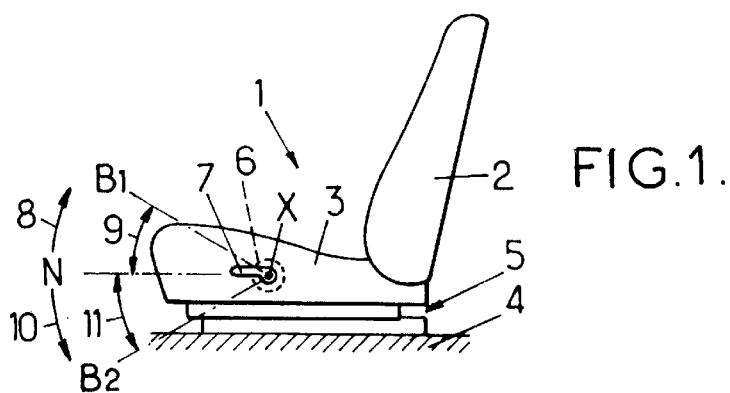
FIG. 1 is a diagrammatic view of a vehicle seat the seat part of which is adjustable in height by means of an irreversible adjustment mechanism according to the invention.

FIG. 1 shows a vehicle seat which comprises a back 2 carried by a seat part 3 which is itself mounted on the floor 4 of the vehicle, for example by means of longitudinal slide rails 5.

The seat part 3 is connected to the slide rails 5 by means of a known height raising mechanism (not shown) which enables the height of the seat part 3 to be adjusted. This height raising mechanism is driven by an irreversible adjusting mechanism 6, itself driven by a control lever 7 (or a handle of different shape) pivoting mounted around a transverse horizontal axis of rotation X.

The lever 7 is resiliently assisted towards a neutral position N, in which said lever can be arranged for example approximately horizontally. The lever 7 is movable from this neutral position:

along a first angular direction 8, in a first angular sector 9 delimited between the neutral position N and a first stop position B1, and along a second angular direction 10, in a second angular sector 11 delimited between the neutral position N and a second stop position B2.

Figure 2:
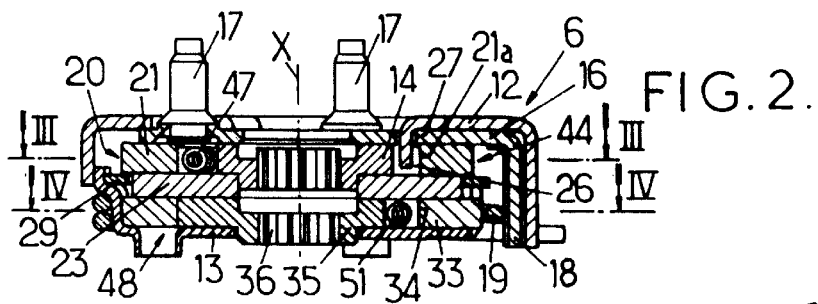
FIG. 2 is a transverse sectional view of an irreversible adjustment mechanism according to a first version of the invention.
Figure 3:
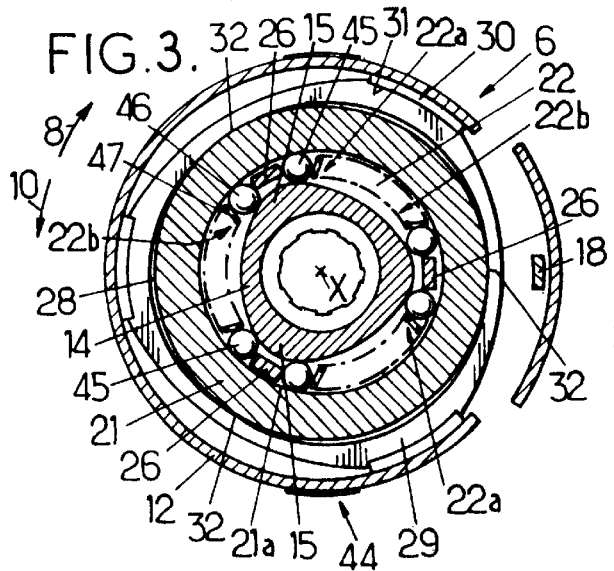
FIGS. 3 and 4 are partial sectional views respectively along lines III—III and IV—IV of FIG. 2.
Figure 4:
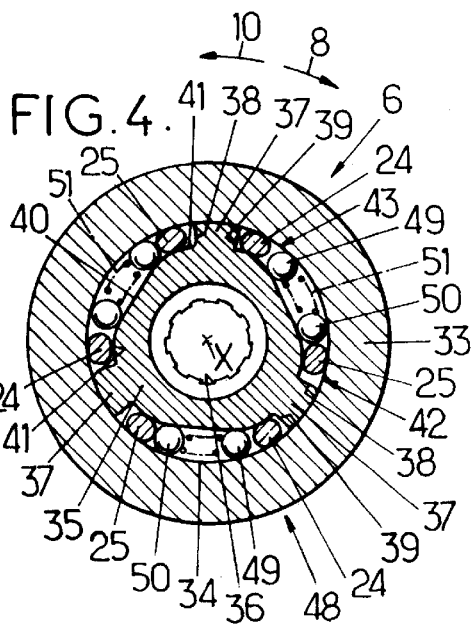

As shown in FIGS. 2 to 4, the irreversible adjustment mechanism 6 comprises a fixed support which, in the example shown, is a casing formed by two sheet metal cheek webs 12, 13 assembled by welding or other means and fixed for example to the frame of the seat part 3 by screwing, riveting, or other means.

Furthermore, the adjustment mechanism comprises besides an input part 14 which, in the example shown, is a metal annular input cam having an approximately triangular external shape the rounded tops of which constitute three bosses 15 projecting radially outwards (see FIG. 3).

This input cam 14 can be for example fixed to a radial sheet metal plate 16 (FIG. 2) which is adjacent to the cheek web 12 of the casing and which is fixed by screws or rivets 17 intended to be fixed to the above mentioned lever 7. The plate 16 is extended axially towards the cheek web 13 of the casing by a tab 18 which is fixed to a torsion spring 19 assisting the input cam 14 towards a neutral position corresponding to the abovementioned neutral position N of the lever 7.

Moreover, the adjustment mechanism 6 also includes an intermediate part 20 comprising a metal collar 21 centered on the axis of rotation X. This collar 21 has an internal cylindrical surface or cylindrical support surface 21a, of revolution around the axis X, and said collar 21 is arranged in contact with the sheet metal plate 16.

The cylindrical support surface 21a radially delimits, with the input cam 14, a hollow intermediate space 22 (see FIG. 3) which forms, on either side of each boss 15 of the input cam, first and second wedge-shaped zones 22a, 22b diverging respectively in the first and second directions 8, 10.

The intermediate part 20 comprises besides a small metal plate 23 welded or fixed by other means on the collar 21 opposite the cheek web 12, this small plate 23 comprising besides three pairs of axial fingers, each of these pairs of axial fingers comprising first and second axial fingers 24, 25 which extend towards the cheek web 13 of the casing parallel to the axis X.

Furthermore, in the intermediate annular space 22 are arranged three fixed axial fingers 26 which can be constituted in particular by tabs cut out in the cheek web 12 of the casing and folded inside said casing. The fixed fingers 26 pass through circular arc cut-outs 27 which are centered on the axis X and which are made in the abovementioned sheet metal plate 16. In the neutral position of the input cam 14, the bosses 15 of this cam are respectively arranged facing the three fixed axial fingers 26

The small plate 23 comprises an outer cylindrical surface 28, of revolution around the axis X, which is clamped in a fixed braking collar 29, which collar 29 can be made for example in plastic material or in metal. This collar 29 can be fixed to the casing 12, 13 in particular by means of axial tabs 30 belonging to the cheek webs 13 of the casing, which tabs are engaged in complementary notches 31 formed in the outside of the collar 29.

This collar 29 is clamped around the small plate 23, and it can be for example in radial contact with the small plate at the level of the three support zones 32 distributed angularly at 120 degrees to one another.

Possibly, the collar 29 could be replaced by any other braking part having at least one zone in radial friction support against the small plate 23.

The clamping of the braking collar on the small plate 23 can be adapted to exert on the intermediate part 20 a braking torque between for example 0.2 and 1 Nm (Newton meter), to advantage of the order of 0.5 Nm.

Furthermore, the adjustment mechanism 6 also comprises a fixed collar 33 integral with the cheek web 13, which has an annular shape centered on the axis X and which comprises an inner cylindrical surface 34 or locking cylindrical surface, of revolution around said axis X.

Inside this fixed collar 33 is arranged an output part 35 or output cam which comprises internally a fluted hole 36 intended to be fixed to an input shaft of the heightening mechanism enabling the height of the seat part 3 of the seat to be adjusted.

Moreover, the output cam 35 comprises externally three radial fingers 37 which project outwards until contact with the cylindrical locking surface 34 and which are distributed angularly at 120 degrees to each other.

Each finger 37 is delimited laterally by first and second counter stop surfaces 38, 39 which are directed respectively in the second and first angular directions 10, 8.

The periphery of the output cam also comprises three recessed zones which each have a central flat part 47 continuing, near the two adjacent projecting fingers 37, by two rounded zones 41 having the shape of a circular arc centered approximately on the axis X. Each flat part 40 delimits, with the cylindrical locking surface 34, first and second wedge shaped spaces 42, 43 diverging respectively in the first and second angular directions 8, 10.

The mechanism 6 which has just been described operates thanks to:

a driving stage which connects the input cam 14 to the intermediate part 20, and a locking stage which connects the intermediate part 20 to the output cam 35.

First of all, the driving stage 44 comprises three pairs of first and second rigid wedging bodies 45, 46, in this case steel balls or rollers, arranged respectively in the intermediate annular space 22, in each of the first and second wedge shaped zones 22a, 22b which are located on both sides of each boss 15 of the input cam 14. Between each first wedging body 45 and the second wedging body 46 corresponding to the adjacent boss 15 of the input cam, is interposed a compression spring 47 also housed in the intermediate annular space 22, so as to assist the wedging body towards the wedge shaped zones 22a, 22b.

In this way, when the activating lever 7 is moved in one or other of the angular directions 8, 10 by moving away from its neutral position N, the bosses 15 of the input cam 14 strongly lock the first wedging bodies 45 against the support surface 21a in the event of activation in the first angular direction 8 and lock the second wedging bodies 46 against the support surface 21a in the event of activation in the second angular direction 10. The input cam 14 then drives the intermediate part 20 after a very small dead angular travel of the lever 7, this dead travel being able to be for example of the order of 1 degree. During this movement, one wedging body out of two remains abutted against the fixed fingers 26.

When the user releases the lever 7 after each activation, said lever is brought back to the neutral position N by means of the spring 19 and/or the springs 47 of the driving stage. During this return movement towards the neutral position, the wedging bodies 45, 46 which have been moved by the input cam 14 return to their initial position with said input cam, by friction against the inner surface 21a of the collar 21. However, this friction is not accompanied by any movement of the intermediate part 20, thanks to the braking collar 29, which holds said intermediate part in place.

It will be noted that the driving stage described above could be replaced if the need arises by a ratchet driving mechanism, or any other mechanism operating by alternate movements of the lever 7.

Furthermore, the locking stage 48 comprises three pairs of first and second clamping bodies 49, 50 (for example steel balls or rollers) which are arranged respectively in the first and second wedge-shaped spaces 42, 43 and which are assisted to mutual separation by compression springs 51 so that in the neutral position, the clamping bodies 42, 43 immobilize the output cam 35 by wedging against the locking surface 34.

Moreover, the first and second clamping bodies 49, 50 of each pair of clamping bodies 49, 50 which is arranged between two radial fingers 37 of the output cam, are surrounded by a pair of first and second axial fingers 24, 25 of the intermediate part 20, with a certain angular play.

More precisely:
- each axial finger 24 is arranged between one of the first clamping bodies 49 and the corresponding second counter stop surface 39, said first finger 24 having a first stop surface adapted to move the corresponding first clamping body,
- and each second axial finger 25 is arranged between one of the second clamping bodies 50 and the corresponding first counter stop surface 38, said second finger 25 having a second stop surface adapted to move the corresponding second clamping body.

When the lever 7 is activated by the user and pivots the intermediate part 20 as explained previously, for example in the second angular direction 10 from the neutral position N (i.e. inside the second angular sector 11), the stop surface of each finger 25 of the intermediate part 20 moves one of the second clamping bodies 50 in the second angular direction 10, which unlocks this second clamping body.

At the time of the first activation of the lever 7 in the second angular sector 11 after an activation of said lever in the first angular sector 9, the contact between the finger 25 and the clamping body 50 only takes place after taking up a certain dead angular travel due to the play between the fingers 25, 26 and the clamping bodies 49, 50.

After unlocking the second clamping bodies 50, the first clamping bodies 49 assist the output cam 35 in the direction 10 under the effect of the springs 51. This assistance may possibly be sufficient to turn the output cam 35, in particular when the mechanism 6 operates empty, i.e. without being subjected to an opposing torque.

On the other hand, when the mechanism 6 operates under load, the pivoting of the intermediate part 20 only rotates the output cam 35 in the angular direction 10 when the first axial fingers 24 of the intermediate part come into contact with the second counter stops 39 of the output cam, i.e. after an additional dead travel of the lever 7 which can for example be of the order of 2 degrees.

Due to the fact that at the end of the activation of the lever 7, the intermediate part 20 is held immobile thanks to the braking collar 29, the second axial fingers 25 then remain in contact with the second clamping bodies 50: if the user carries out several "pumping" movements in the second angular direction 11, the dead angular travel of the lever 7 at the start of each pumping movement is therefore greatly reduced from the second movement, since it is then no longer necessary to take up the play between the fingers 25, 26 and the clamping bodies 49, 50.

The operation of the device would be the same, mutatis mutandis, if the lever 7 was repeatedly activated in the first angular sector 9.

Figure 5:
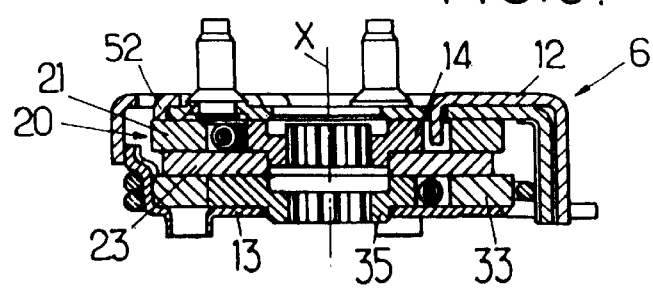
FIG. 5 is a similar view to FIG. 3, for a second version of the invention.

As a variant, as shown in FIG. 5, the braking collar 29 could be eliminated, and replaced by at least one braking block 52 acting axially on the intermediate part 20 in order to exert a similar braking torque to that described above.

For example, the braking blocks 52 can be three in number and be distributed angularly at 120 degrees to each other, these braking blocks being able to be constituted by tabs cut out in the sheet metal of one of the cheek webs 12, 13 of the casing.

I claim:

1. An irreversible adjustment mechanism comprising:
   a fixed support,
   an input part pivoting mounted relative to the support around an axis of rotation, this input part being resiliently assisted to a neutral position and being moveable along a first direction from the neutral position, in a first angular sector, and along a second direction opposite to the first direction from the neutral position, in a second angular sector,
   an intermediate part pivoting mounted around the axis of rotation,
   a driving stage connecting the input part to the intermediate part and adapted to:
      positively drive the intermediate part with the input part by means of at least one driving part when the input part is moved by moving away from its neutral position,
      and to move the driving part with the input part when this input part returns to its neutral position, with friction of the driving part against the intermediate part,
   a locking surface which is integral with the support and which has a shape of revolution centered on the axis of rotation,
   an output part which is pivoting mounted around the axis of rotation and which is shaped to delimit, with the locking surface, at least one pair of wedge shaped spaces including first and second hollow wedge-shaped spaces, these first and second wedge-shaped spaces diverging respectively in the first and second angular directions,
   and a locking stage connecting the intermediate part to the output part, this locking stage comprising:
      at least one pair of clamping bodies including first and second rigid clamping bodies which are arranged respectively in the first and second wedge-shaped spaces and which are resiliently assisted respectively in the first and second angular directions to be wedged between the output part and the locking surface,
      at least first and second rigid stop surfaces integral with the intermediate part, which are directed respectively in the first and second angular directions, the first stop surface being adapted to abut against the first clamping body unwedging it when the intermediate part turns in the first angular direction, and the second stop surface being adapted to abut against the second clamping body unwedging it when the intermediate part turns in the second angular direction, the first and second stop surfaces having a certain angular play relative to the first and second clamping bodies,
      and at least first and second counter stop surfaces which are integral with the output part, the first counter stop surface being adapted to limit the relative movement of the intermediate part relative to the output part in the first angular direction after said first stop surface has sufficiently moved the first clamping body in order to unwedge it, so as to then make said output part be driven by the intermediate part, and the second counter stop surface being adapted to limit the relative movement of the intermediate part relative to the output part in the second angular direction after said second stop surface has sufficiently moved the second clamping body to unwedge it, so as to then make said output part be driven by the intermediate part, wherein the intermediate part is braked relative to the support, with a braking torque sufficient to hold the intermediate part fixed during each return movement of the input part to its neutral position after locking of the locking stage.

2. A mechanism according to claim 1, wherein the braking torque sustained by the intermediate part is between 0.2 and 1 Nm.

3. A mechanism according to claim 1, wherein the intermediate part is braked by means of a braking part which is integral with the support and which is radially supported with friction against said intermediate part.

4. A mechanism according to claim 3, wherein the braking part is a collar which is in contact with the intermediate part in three support zones.

5. A mechanism according to claim 1, wherein the support includes a casing which contains at least the intermediate, which intermediate part is braked by means of at least one braking block which is integral with said casing and which is applied axially with friction against said intermediate part, parallel to the axis of rotation.

6. A mechanism according to claim 5, wherein the intermediate part is braked by at least three braking blocks which are integral with the casing and which are applied axially with friction against said intermediate part, parallel to the axis of rotation.

7. A mechanism according to claim 5, wherein the casing is made of sheet metal and each braking block is constituted by a tab cut out in the sheet metal of said casing.

8. A mechanism according to claim 1, wherein the first and second clamping bodies of each pair of clamping bodies are assisted to mutual separation by a compression spring and are surrounded by a pair of axial fingers including first and second axial fingers integral with the intermediate part, these first and second axial fingers including respectively the first and second stop surfaces, the first counter stop surface of the output part being adapted to abut against the second axial finger of the intermediate part when this intermediate part moves in the first angular direction, and the second counter stop surface of the output part being adapted to abut against the first axial finger of the intermediate part when this intermediate part moves in the second angular direction.

9. A mechanism according to claim 1, wherein the driving stage comprises:

a support surface integral with the intermediate part, which support surface has a shape of revolution centered on the axis of rotation and radially delimits with the input part an intermediate hollow annular space (22), the input part comprising at least one boss which projects into said intermediate annular space and which delimits first and second wedge-shaped zones in this intermediate annular space, these first and second wedge shaped zones diverging respectively in the first and second angular directions, a pair of wedging bodies including first and second rigid wedging bodies which are arranged in the intermediate annular space and which are resiliently assisted to the first and second wedge-shaped zones of said intermediate annular space to be wedged between the boss of the input part and the support surface of the intermediate part, these first and second wedging bodies each constituting one of the abovementioned driving parts, and at least one fixed axial finger which is integral with the support and which is arranged in said intermediate annular space, the boss of the input part being arranged facing the fixed axial finger when said input part is in its neutral position.

10. A mechanism according to claim 9, wherein the driving stage comprises at least three pairs of wedging bodies, the first and second wedging bodies of each pair of wedging bodies being arranged on either side of a fixed axial finger and a boss of the input part, the first wedging body of each pair of wedging bodies being held spaced from the second wedging body of an adjacent pair of wedging bodies by a compression spring.

* * * * *